(12) United States Patent
Wu et al.

(10) Patent No.: US 12,149,815 B2
(45) Date of Patent: Nov. 19, 2024

(54) IMAGE PROCESSING DEVICE, IMAGE PROCESSING SYSTEM AND METHOD OF IMAGE PROCESSING

(71) Applicant: AVer Information Inc., New Taipei (TW)

(72) Inventors: Po-Hsun Wu, New Taipei (TW); Yun-Long Sie, New Taipei (TW)

(73) Assignee: A Ver Information Inc., New Taipei (TW)

( * ) Notice: Subject to any disclaimer, the term of this patent is extended or adjusted under 35 U.S.C. 154(b) by 423 days.

(21) Appl. No.: 17/655,792

(22) Filed: Mar. 22, 2022

(65) Prior Publication Data
US 2022/0303452 A1    Sep. 22, 2022

(30) Foreign Application Priority Data

Mar. 22, 2021   (TW) .................... 110110246

(51) Int. Cl.
*H04N 23/62* (2023.01)
*H04N 5/268* (2006.01)
*H04N 5/272* (2006.01)
*H04N 23/66* (2023.01)
*H04N 23/67* (2023.01)
*H04N 23/695* (2023.01)

(52) U.S. Cl.
CPC ............ *H04N 23/62* (2023.01); *H04N 5/268* (2013.01); *H04N 5/272* (2013.01); *H04N 23/66* (2023.01); *H04N 23/675* (2023.01); *H04N 23/695* (2023.01)

(58) Field of Classification Search
CPC ...... H04N 23/62; H04N 23/66; H04N 23/695; H04N 23/675; H04N 5/268; H04N 5/272
See application file for complete search history.

(56) References Cited

U.S. PATENT DOCUMENTS

2007/0242066 A1* 10/2007 Levy Rosenthal .... H04N 5/272
   345/419
2010/0231754 A1*  9/2010 Wang ..................... H04N 5/76
   348/231.99

FOREIGN PATENT DOCUMENTS

| CN | 105493501 A | * | 4/2016 | ............ H04N 5/262 |
| TW | 200735662 A |   | 9/2007 | |
| TW | I364725 B   |   | 5/2012 | |
| WO | WO-2016008457 A1 | * | 1/2016 | ............ H04N 5/265 |

* cited by examiner

*Primary Examiner* — Olisa Anwah
(74) *Attorney, Agent, or Firm* — CKC & Partners Co., LLC (57) ABSTRACT

A method of image processing includes: capturing a first video streaming from a physical environment using an image capturing device; conducting image processing on the first video streaming to provide a second video streaming to a virtual camera module; capturing a frame of a display area of a display device when the virtual camera is opened by an application; acquiring a position of the second video streaming in a frame of the display area, and generating a user interface according to the position of the second video streaming if the frame of the display area comprises the second video streaming; and receiving an operation instruction through the user interface, and operating the image capturing device according to the operation instruction.

20 Claims, 6 Drawing Sheets

IMAGE PROCESSING DEVICE, IMAGE PROCESSING SYSTEM AND METHOD OF IMAGE PROCESSING

RELATED APPLICATION

This application claims priority to Taiwan Application Serial Number 110110246, filed on Mar. 22, 2021, which is herein incorporated by reference in its entirety.

BACKGROUND

Field of Invention

The present disclosure relates to an image processing device, an image processing system, and a method of image processing. More particularly, the present disclosure relates to an image processing device, an image processing system, and a method of image processing including a virtual camera module.

Description of Related Art

In conventional video streaming devices, some web cameras have a function of frame tracking for video streaming. A user can select a tracking target in video streaming so that web cameras is configured to adjust a frame of video streaming according to a tracking target.

However, other communication software are available for video streaming in conventional market, a user still cannot directly select a tracking target in video streaming provided by communication software, which makes it difficult to implement a function of frame tracking.

SUMMARY

One aspect of the present disclosure provides a method of image processing, which includes: capturing a first video streaming from a physical environment using an image capturing device; conducting an image processing on the first video streaming to provide a second video streaming to a virtual camera module; capturing a frame of a display area of a display device when the virtual camera module is opened by an application; acquiring a position of the second video streaming in a frame of the display area, and generating a user interface according to the position of the second video streaming if the frame of the display area includes the second video streaming; and receiving an operation instruction through the user interface, and operating the image capturing device according to the operation instruction.

Another aspect of the present disclosure provides an image processing system, which includes an image capturing device and an image processing device. The image capturing device is configured to capture a first video streaming from a physical environment. The image processing device is coupled to the image capturing device. The image processing device includes a virtual camera module and an image processing module. The image processing module is configured to conduct an image processing on the first video streaming to provide a second video streaming to the virtual camera module. When the virtual camera module is opened by an application, the image processing module is configured to capture a frame of a display area of the image processing device. If a frame of the display area includes the second video streaming, the image processing module is further configured to: acquire a position of the second video streaming in the frame of the display area, and generate a user interface according to the position of the second video streaming; and receive an operation instruction through the user interface, and operate the image capturing device according to the operation instruction.

Another aspect of the present disclosure provides an image processing device, which includes a virtual camera module and an image processing module. The image processing module is configured to conduct an image processing on a first video streaming to provide a second video streaming to the virtual camera module. When the virtual camera module is opened by an application, the image processing module is configured to capture a frame of a display area of the image processing device. If a frame of the display area includes the second video streaming, the image processing module is further configured to: acquire a position of the second video streaming in the frame of the display area, and generate a user interface according to the position of the second video streaming; and receive an operation instruction through the user interface, and operate the image capturing device according to the operation instruction.

One of advantages of the aforementioned image processing device, the image processing system and the method of image processing is to provide users with a function of automatic tracking on a video stream of a third-party communication software.

BRIEF DESCRIPTION OF THE DRAWINGS

The present disclosure can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise.

Furthermore, it should be understood that the terms, "comprising", "including", "having", "containing", "involving" and the like, used herein are open-ended, that is, including but not limited to.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

Figure 1:
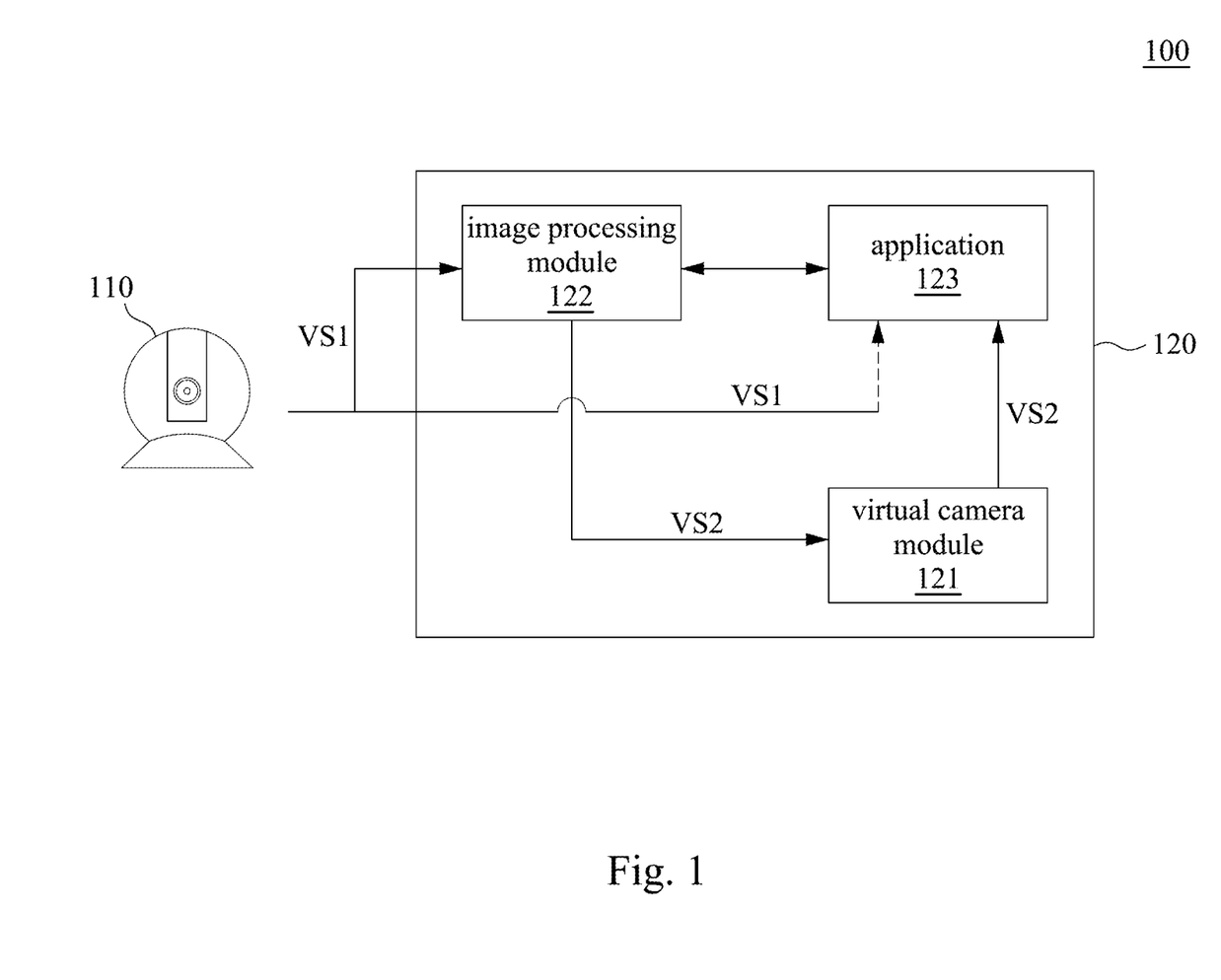
FIG. 1 depicts a schematic diagram of an image processing system according to some embodiments of the present disclosure.

FIG. 1 depicts a schematic diagram of an image processing system 100 according to some embodiments of the present disclosure. As shown in FIG. 1, the image processing system 100 includes an image capturing device 110 and an image processing device 120. The image processing system 100 is configured to transmit a video streaming VS1 generated by the image capturing device 110 filming an actual physical environment to the image processing device 120 for processing to generate a video streaming VS2.

In some embodiments, the image capturing device 110 can be implemented by a web camera, a universal serial bus (USB) camera, a wireless camera, or a camera built into a tablet computer. The image processing device 120 can be implemented by a personal computer (PC), a tablet computer, or a smartphone.

The image processing device 120 includes a virtual camera module 121, an image processing module 122, and an application 123. In practice, the virtual camera module 121, the image processing module 122, and the application 123 are stored in the image processing device 120. The image processing module 122 and the application 123 can operate an operating system executed by the image processing device 120. In some embodiments of the present disclosure, the application 123 is a third-party communication application (e.g. Skype or Zoom) with video streaming capabilities.

In some embodiments, the virtual camera module 121 can be a virtual camera circuit of the image processing device 120. The image processing module 122 can be an image processing circuit of the image processing device 120.

The virtual camera module 121 is configured to virtualize a camera unit recognized by the application 123. In some embodiments, when the user operates the application 123 to perform video streaming applications such as video conferencing or video monitoring, the application 123 can be configured to select the coupled image capturing device 110 (e.g. an external webcam) directly as a source of a video streaming, and can be configured to transmit a command to acquire real-time image to the image capturing device 110. Alternatively, the application 123 can be configured to select a camera unit virtualized by the virtual camera module 121 as a source of a video streaming, and can be configured to transmit a command to acquire real-time image to the virtual camera module 121. The virtual camera module 121 is configured to output its own video streaming to the application 123, or provide a plurality of processed video streaming from the image capturing device 110 to the application 123. In other words, the application 123 can configured to choose to receive the video streaming VS1 from the image capturing device 110, or to receive the video streaming VS2 from the virtual camera module 121.

Figure 2:
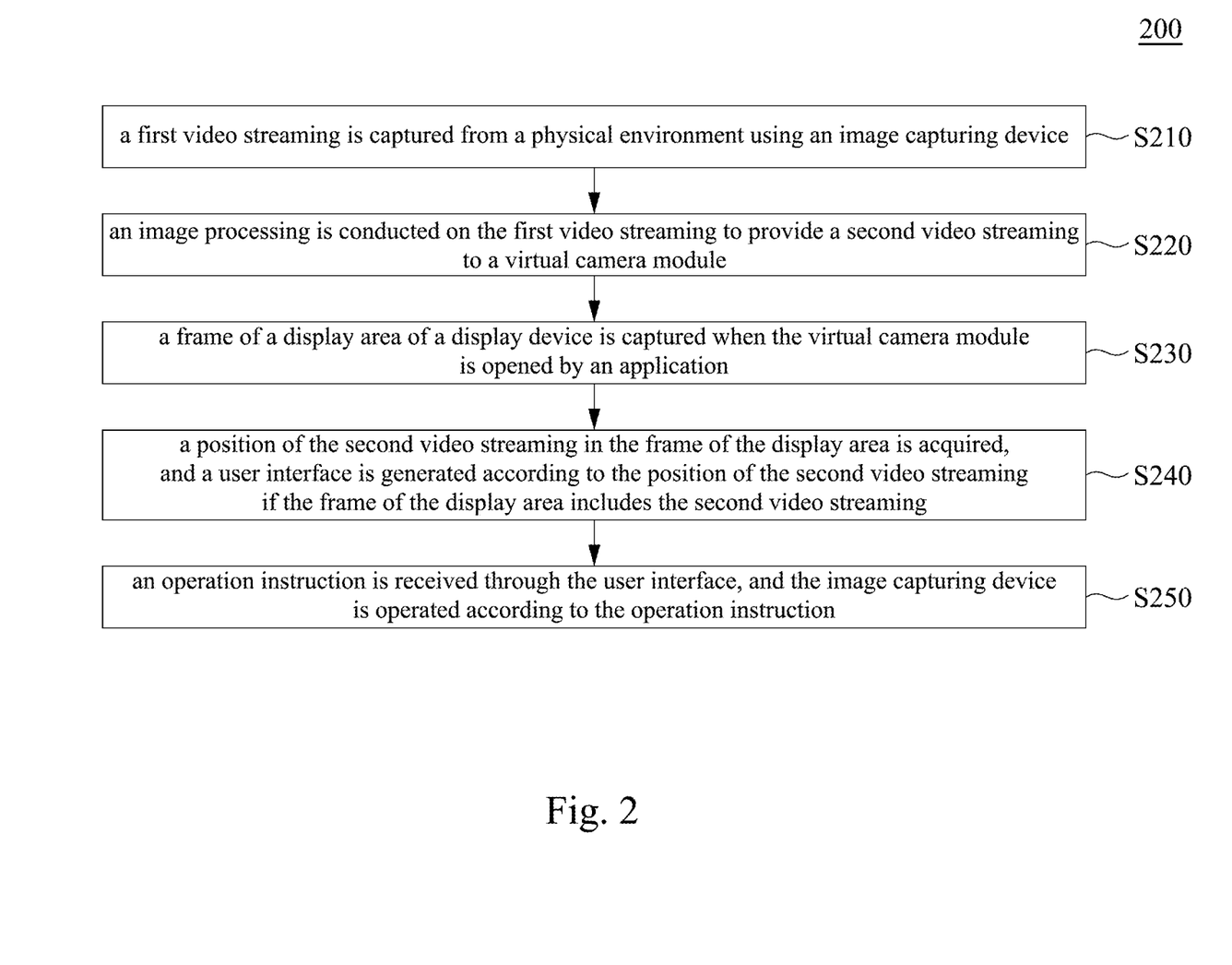
FIG. 2 depicts a flow chart of a method of image processing according to some embodiments of the present disclosure.

FIG. 2 depicts a flow chart of a method of image processing 200 according to some embodiments of the present disclosure. The method of image processing 200 is adapted for the image processing system 100 shown in FIG. 1. For convenience of explanation, the aforementioned process in the method of image processing 200 of FIG. 2 will be described below with FIG. 1, but not limited thereto.

In process S210, the image capturing device 110 is configured to capture a video streaming VS1 from a physical environment, and is configured to transmit the video streaming VS1 to the image processing module 122 according to a real time streaming protocol (RTSP). In some embodiments, the video streaming VS1 can be transmitted according to various appropriate communication protocols such as Transmission Control Protocol/Internet Protocol (TCP/IP), Transmission Control Protocol/User Datagram Protocol (TCP/UDP), and Real-time Transport Protocol/Real-time Transport Control Protocol (RTP/RTCP).

In process S220, the image processing module 122 is configured to provide the video streaming VS2 to the virtual camera module 121 according to the video streaming VS1. In some embodiments, the image processing module 122 can be configured to conduct an image processing on the received video streaming VS1 to generate the video streaming VS2 different from the video streaming VS1. For example, the image processing module 122 can be configured to change a resolution of the video streaming VS1, or to adjust a brightness or a contrast of the video streaming VS1 to generate a different video streaming VS2.

Figure 3:
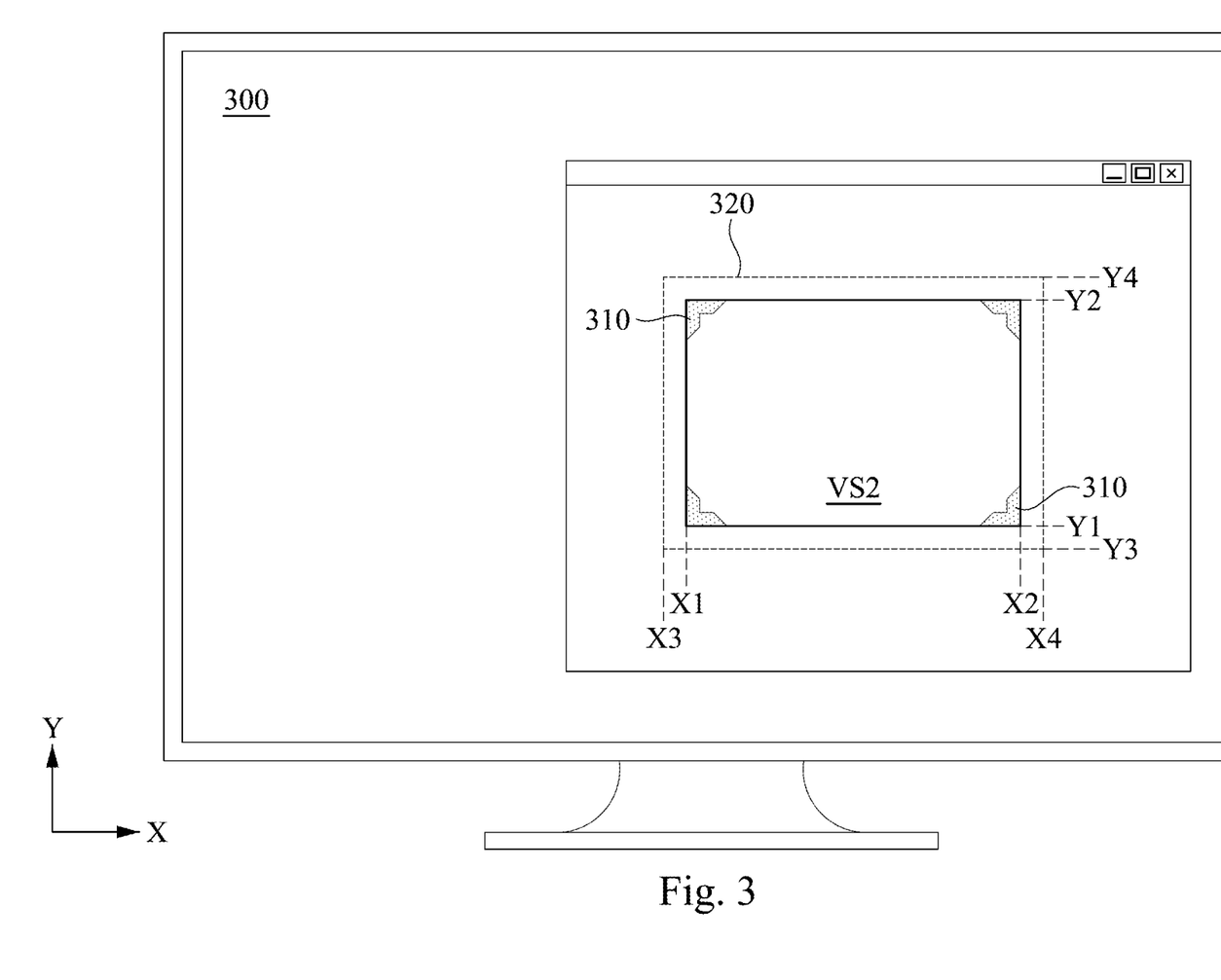
FIG. 3 depicts a schematic diagram of a display area according to some embodiments of the present disclosure.

FIG. 3 depicts a schematic diagram of a display area 300 according to some embodiments of the present disclosure. The process S220 of the method of image processing 200 will be described in detail below with FIG. 3, but not limited thereto. In some embodiments, the display area 300 refers to an active area on a display screen coupled to the image processing device 120 that does not include a border, and the display area 300 is a desktop graphical user interface (GUI) that can be used to display an operating system executed by the image processing device 120.

In some embodiments, in process S220, when the image processing module 122 is configured to generate the video streaming VS2 according to the video streaming VS1, the image processing module 122 is further configured to superimpose a plurality of recognition patterns 310 in the video streaming VS1 to generate the video streaming VS2. Take FIG. 3 as an example, when the image processing module 122 is configured to receive the video streaming VS1 from the image capturing device 120, the image processing module 122 can be configured to generate four additional recognition patterns 310 in four corners of the video streaming VS1 in advance. The aforementioned four recognition patterns 310 and the video streaming VS1 are provided to the virtual camera module 121 as the video streaming VS2 so that the image processing module 122 is configured to define a display range of the video streaming VS2 by the aforementioned four recognition patterns 310 in a subsequent process. That is, the video streaming VS2 includes the four recognition patterns 310 and an image content of the video streaming VS1.

Continuing process S220, in process S230, when the virtual camera module 121 is opened by the application 123, the image processing module 122 is configured to capture a frame of the display area 300. In detail, when a user execute the application 123 (e.g., a communication software Skype), the virtual camera module 121 is configured to display the video streaming VS2 at an unspecified position specified by the application 123 in the display area 300 according to a real-time video command sent by the application 123. At that time, the image processing module 122 is configured to capture a full frame of the display area so that the image processing device 120 is configured to identify positions of the video streaming VS2 in the display area 300 in a subsequent process S240.

In process S240, if a frame of the display area 300 includes the video streaming VS2, the image processing module 122 is configured to acquire positions of the video streaming VS2 in the frame of the display area 300, and is configured to generate a user interface 320 according to positions of the video streaming VS2. In detail, the image processing module 122 can be configured to determine a display range of the video streaming VS2 from the frame of the display area 300 captured in the process S230, and generate the user interface 320 at a position corresponding to the display range of the video streaming VS2.

In some embodiments, the user interface 320 includes a transparent display layer, and the user interface 320 and the video streaming VS2 are at least partially overlapped. In other words, a size of the user interface 320 (La a size of the transparent display layer) can be completely overlapped the video streaming VS2 with a same display range of the video streaming VS2. Alternatively, the size of the user interface 320 (i.e. a size of the transparent display layer) can be slightly larger than the display range of the video streaming VS2 and partially overlap the video streaming VS2.

For example, a range of the video streaming VS2 in a first direction (i.e. X axis direction) is from a coordinate X1 to a coordinate X2 of the display area 300, and a range of the video streaming VS2 in a second direction a Y axis direction) is from a coordinate Y1 to a coordinate Y2 of the display area 300. When the image processing module 122 is configured to determine a position of the video streaming VS2, the image processing module 122 is configured to generate the user interface 320 completely overlapping the video streaming VS2 in a range defined by the coordinate X1, the coordinate X2, the coordinate Y1, and the coordinate Y2, or to generate the user interface 320 partially overlapping the video streaming VS2 in a large range defined by the coordinate X1, the coordinate X2, the coordinate Y1, and the coordinate Y2 of the display area 300.

It should be note that, in general, a display position of the video streaming VS2 in the display area 300 is correlated to a window position of the application 123. In other words, when a user moves the window position of the application 123 in the display area 300 according to actual needs, the display position of the video streaming VS2 will also change accordingly. At that time, the image processing module 122 can be configured to execute the process S230 to re-capture an image frame of the display area 300. In the process S240 The image processing module 122 can be configured to capture an update position of the video streaming VS2 in the display area 300 so as to generate the user interface 320 according to the update position of the video streaming VS2.

Figure 4:
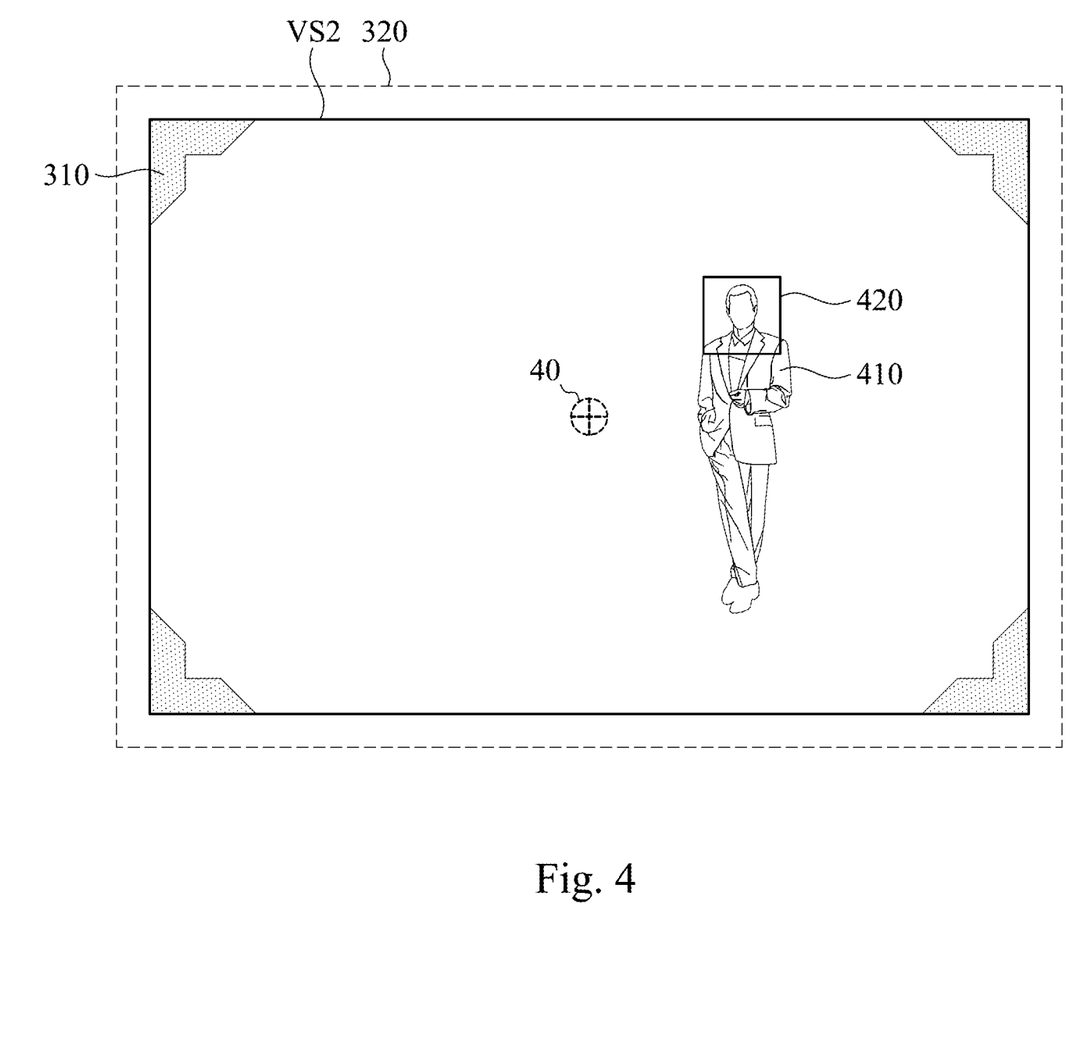
FIG. 4 depicts a schematic diagram of a video streaming according to some embodiments of the present disclosure.
Figure 5A:
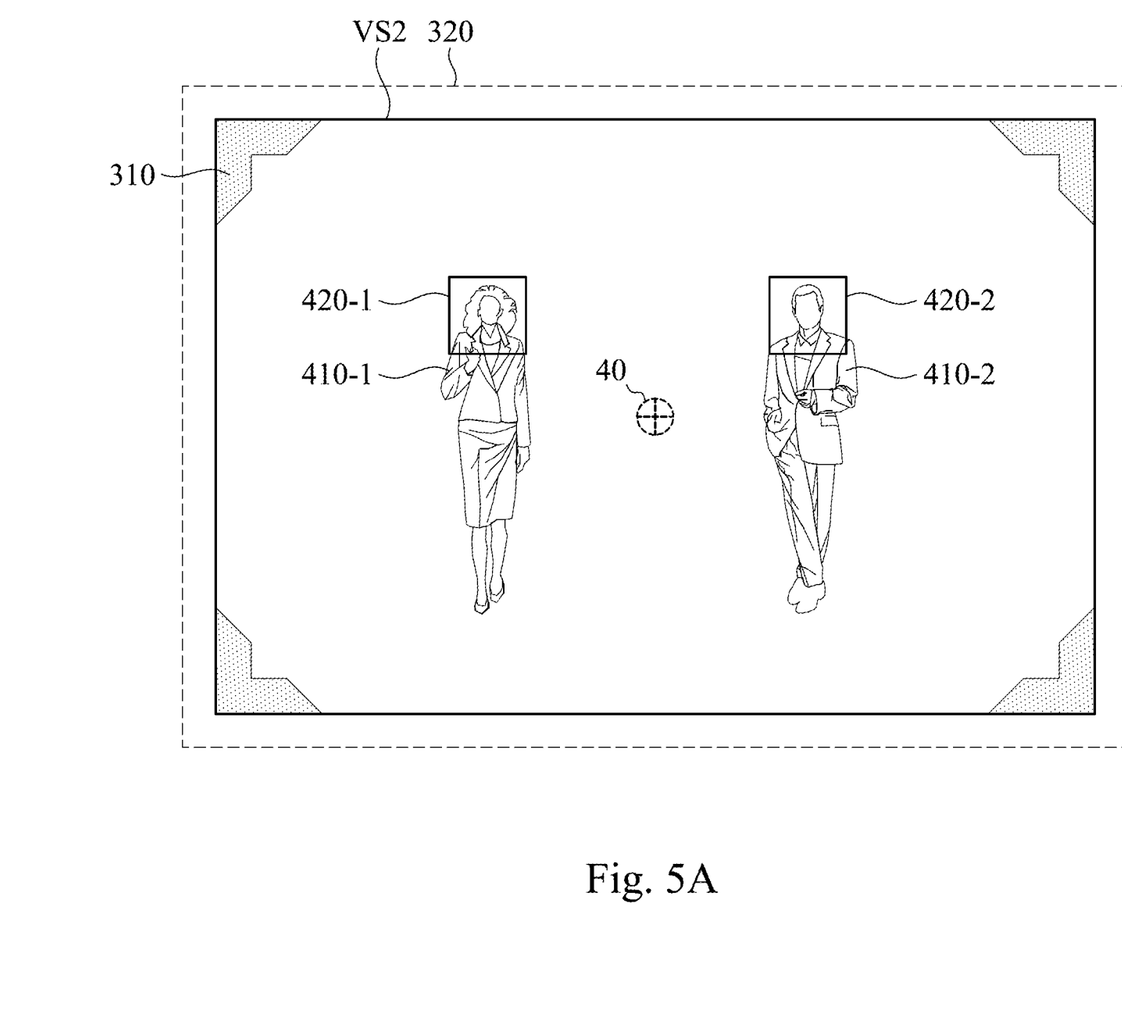
FIGS. 5A-5B depict a schematic diagram of a video streaming according to some embodiments of the present disclosure.
Figure 5B:
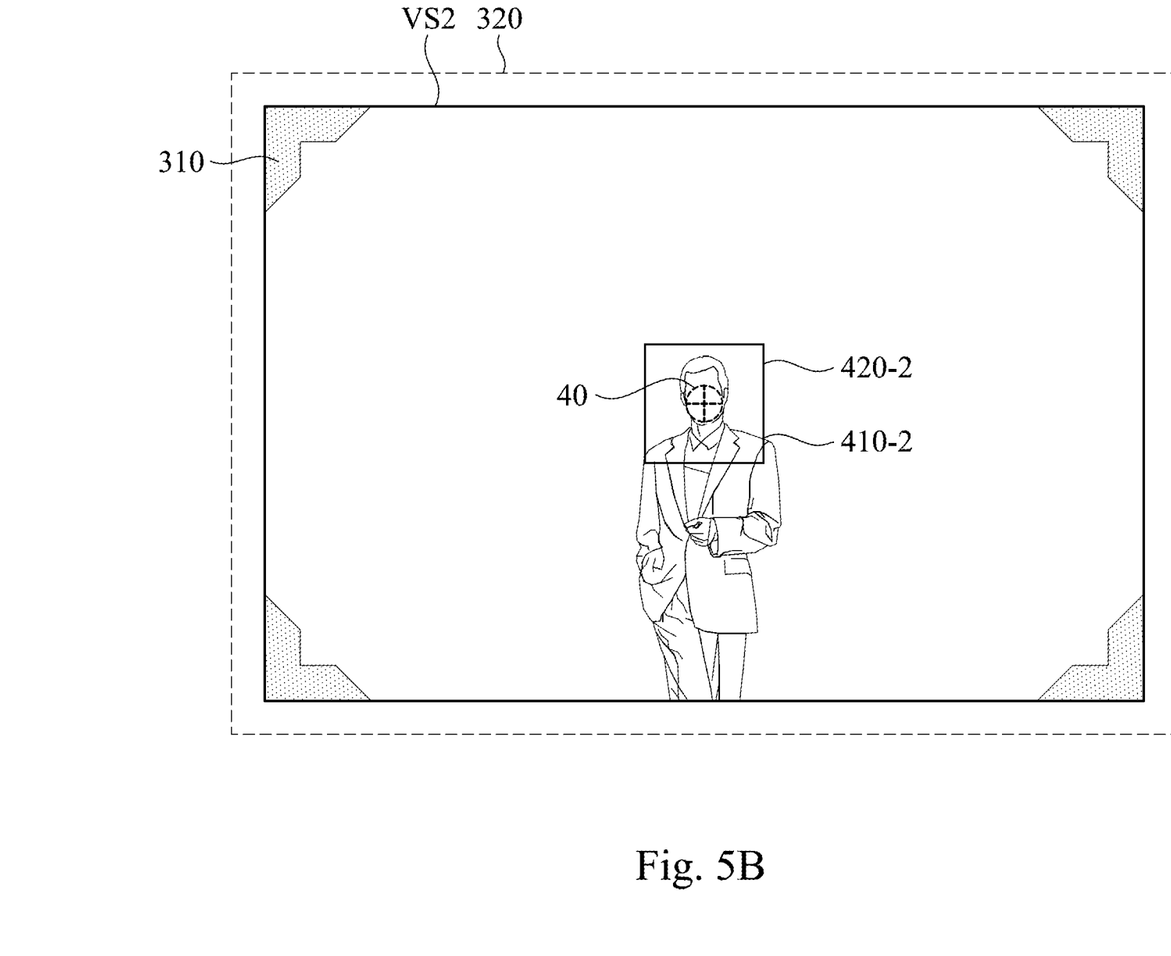

FIG. 4 depicts a schematic diagram of the video streaming VS2 according to some embodiments of the present disclosure. FIGS. 5A-5B depict schematic diagrams of a video streaming VS2 according to some embodiments of the present disclosure. For convenience of explanation, the process S240 in the method of image processing 200 will be described below with FIG. 4, and FIGS. 5A-5B, but not limited thereto.

In some embodiments, in the process 240, when the image processing module 122 is configured to generate the user interface 320 according to the position of the video streaming VS2, the image processing module 122 is further configured to generate a marked frame corresponding to an image of an object to be identified in the user interface 320 according to the image of the object to be identified in the video streaming VS1. In detail, the transparent display layer of the user interface 320 will show some non-transparent patterns (e.g. a marked frame 420).

As shown in FIG. 4, the video streaming VS2 includes an image of an object to be identified 410 (e.g., human face or human silhouette) captured by the image capturing device 120 from the physical environment. At this time, the image processing module 122 is configured to generate a corresponding marked frame 420 according to the position of the image of the object to be identified 410 in the video streaming VS2. In some embodiments, the marked frame 420 can surround all or part of the image of the object to be identified 410. In some embodiments, as shown in FIG. 5A, the video streaming VS1 can include images of a plurality of an object to be identified 410-1 and an object to be identified 410-2, and the image processing module 122 is also configured to generate a plurality of corresponding marked frame 420-1 and corresponding marked frame 420-2 so as to mark positions of the images of the object to be identified 410-1 and the object to be identified 410-2 in the video streaming VS2 respectively.

Following the process S240, in a process S250, the image processing device 120 is configured to receive an operation instruction through the user interface 320, and operate the image capturing device 110 according to the operation instruction. In detail, when a mouse click is detected by the transparent display layer of the user interface 320, the image processing module 122 can be configured to determine a location where a user clicked according to an mouse movement position of the mouse at this time, and execute a corresponding function according to the location where a user clicked so as to operate the image capturing device 110. Take FIG. 5A as an example, the image processing device 120 is configured to receive an operation instruction of a user through the user interface 320 (e.g., click the marked frame 420-1 or the marked frame 420-2 in the user interface 320) so as to select one of the marked frame 420-1 and the marked frame 420-2. When the image processing module 122 is configured to determine that the mouse moves to coordinates corresponding to the marked frame 420-1 during the click, the image processing module 122 will be configured to select the marked frame 420-1 according to the aforementioned coordinates and a click instruction, and execute a function of frame tracking so as to operate the image capturing device 110 to track the marked frame 420-1 in the physical environment corresponding to the object to be identified 410-1.

In some embodiments, when the image capturing device 110 is configured to track an object to be identified, the image capturing device 110 is configured to will automatically focus on the tracked object to be identified so that a center 40 of the video streaming VS2 is aligned with an image of the object to be identified tracked by the image capturing device 110. For example, when the user interface 320 is configured to receive an operation instruction that a user clicks the marked frame 420-2, the image capturing device 110 is configured to track the object to be identified 410-2 corresponding to the marked frame 420-2 so as to align the center 40 of the video streaming VS2 with the image of the object to be identified 410-2. Therefore, the frame of the video streaming VS2 will also change from FIG. 5A to FIG. 5B.

In other words, with the aforementioned image processing device 120, the image processing system 100, and the method of image processing 200, a user can set the image capturing device 110 to automatically track an object through the user interface 320 so as to execute a function of automatically tracking in the video streaming of any third-party applications.

In some embodiments, the aforementioned image processing device 120, the image processing system 100 and the method of image processing 200 can be configured to execute functions such as Auto Focus, frame pan-tilt-zoom (PTZ) operations. For example, a user can click a right arrow (not shown in the figure) displayed on the transparent display layer of the user interface 320 so that the image processing module 122 is configured to execute a function of panning according to an aforementioned click position to operate the image capturing device 110 to move the frame to a right. Alternatively, a user can click an auto focus switch (not shown in the figure) displayed in the user interface 320 to turn the auto focus switch on so that the image processing module 122 is configured to execute a function of automatic tracking to operate the image capturing device 110 to perform auto focus.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A method of image processing, comprising:
   capturing a first video streaming from a physical environment using an image capturing device;
   conducting an image processing on the first video streaming to provide a second video streaming to a virtual camera module;
   capturing a frame of a display area of a display device when the virtual camera module is opened by an application;
   acquiring a position of the second video streaming in a frame of the display area, and generating a user interface according to the position of the second video streaming if the frame of the display area comprises the second video streaming; and
   receiving an operation instruction through the user interface, and operating the image capturing device according to the operation instruction.

2. The method of image processing of claim 1, wherein generating the user interface according to the position of the second video streaming comprises:
   generating a marked frame corresponding to an object to be identified in the user interface according to the object to be identified in the first video streaming; and
   commanding the image capturing device to track the object to be identified in the physical environment when the operation instruction selects the marked frame.

3. The method of image processing of claim 1, wherein conducting the image processing on the first video streaming to provide the second video streaming to the virtual camera module comprises:
   marking a plurality of recognition patterns in the first video streaming so as to generate the second video streaming, wherein the plurality of recognition patterns are located at an edge of the second video streaming.

4. The method of image processing of claim 1, wherein the application is configured to choose to receive the first video streaming from the image capturing device or to receive the second video streaming from the virtual camera module.

5. The method of image processing of claim 1, wherein the image capturing device comprises one of a web camera, a universal serial bus (USB) camera, a wireless camera, and a camera built into a tablet computer.

6. The method of image processing of claim 1, wherein the application comprises a third-party communication application.

7. An image processing system, comprising:
   an image capturing device, configured to capture a first video streaming from a physical environment; and
   an image processing device, coupled to the image capturing device, wherein the image processing device comprises:
      a virtual camera module; and
      an image processing module, configured to conduct an image processing on the first video streaming to provide a second video streaming to the virtual camera module, wherein the image processing module is configured to capture a frame of a display area of the image processing device when the virtual camera module is opened by an application, wherein if a frame of the display area comprises the second video streaming, the image processing module is further configured to:
         acquire a position of the second video streaming in the frame of the display area, and generating a user interface according to the position of the second video streaming; and
         receive an operation instruction through the user interface, and operating the image capturing device according to the operation instruction.

8. The image processing system of claim 7, wherein when the image processing module is configured to generate the user interface according to the position of the second video streaming, the image processing module is further configured to execute to:
   generate a marked frame corresponding to an image of an object to be identified in the user interface according to the image of the object to be identified in the first video streaming; and
   command the image capturing device to track the object to be identified in the physical environment when the operation instruction selects the marked frame.

9. The image processing system of claim 7, wherein when the image processing module is configured to conduct the image processing on the first video streaming to provide the second video streaming to the virtual camera module, the image processing module is further configured to execute to:
   mark a plurality of recognition patterns in the first video streaming so as to generate the second video streaming, wherein the plurality of recognition patterns are located at an edge of the second video streaming.

10. The image processing system of claim 7, wherein the user interface and the second video streaming are at least partially overlapped.

11. The image processing system of claim 7, wherein the application is configured to choose to receive the first video streaming from the image capturing device or to receive the second video streaming from the virtual camera module.

12. The image processing system of claim 7, wherein the image capturing device comprises one of a web camera, a universal serial bus (USB) camera, a wireless camera, and a camera built into a tablet computer.

13. The image processing system of claim 7, wherein the image processing device comprises one of a personal computer (PC), a tablet computer, and a smartphone.

14. The image processing system of claim 7, wherein the application comprises a third-party communication application.

15. An image processing device, comprising:
   a virtual camera module; and an image processing module, configured to conduct an image processing on a first video streaming to provide a second video streaming to the virtual camera module, wherein the image processing module is configured to capture a frame of a display area of the image processing device when the virtual camera module is opened by an application, wherein if a frame of the display area comprises the second video streaming, the image processing module is further configured to:

acquire a position of the second video streaming in the frame of the display area, and generating a user interface according to the position of the second video streaming; and receive an operation instruction through the user interface, and operating the image capturing device according to the operation instruction.

16. The image processing device of claim 15, wherein when the image processing module is configured to generate the user interface according to the position of the second video streaming, the image processing module is further configured to execute to:

generate a marked frame corresponding to an object to be identified in the user interface according to the object to be identified in the first video streaming; and command the image capturing device to track the object to be identified in a physical environment when the operation instruction selects the marked frame.

17. The image processing device of claim 16, wherein when the image processing module is configured to operate the image capturing device according to the operation instruction, the image processing module is further configured to execute to:

command the image capturing device to track the object to be identified in the physical environment when the operation instruction selects the marked frame.

18. The image processing device of claim 15, wherein the application is configured to choose to receive the first video streaming from the image capturing device or to receive the second video streaming from the virtual camera module.

19. The image processing device of claim 15, wherein the application comprises a third-party communication application.

20. The image processing device of claim 15, wherein the image processing device comprises one of a personal computer (PC), a tablet computer, and a smartphone.

* * * * *